US010528140B2

(12) United States Patent
Yamazaki et al.

(10) Patent No.: US 10,528,140 B2
(45) Date of Patent: Jan. 7, 2020

(54) HAPTIC FEEDBACK SYSTEM FOR AN ELECTRONIC DEVICE

(71) Applicant: LENOVO (SINGAPORE) PTE. LTD., Singapore (SG)

(72) Inventors: Mitsuhiro Yamazaki, Kanagawa (JP); Kazunori Yamamura, Kanagawa (JP); Jake Laurence Pat Santiago, Kanagawa (JP)

(73) Assignee: LENOVO (SINGAPORE) PTE LTD, Singapore (SG)

( * ) Notice: Subject to any disclaimer, the term of this patent is extended or adjusted under 35 U.S.C. 154(b) by 0 days.

(21) Appl. No.: 15/984,016

(22) Filed: May 18, 2018

(65) Prior Publication Data

US 2018/0335850 A1    Nov. 22, 2018

(30) Foreign Application Priority Data

May 18, 2017    (JP) .................. 2017-099124

(51) Int. Cl.
*G06F 3/01* (2006.01)
*G06F 3/041* (2006.01)
*G06F 1/16* (2006.01)

(52) U.S. Cl.
CPC ............ *G06F 3/016* (2013.01); *G06F 1/1626* (2013.01); *G06F 1/1637* (2013.01); *G06F 1/1643* (2013.01); *G06F 1/1658* (2013.01); *G06F 1/1684* (2013.01); *G06F 3/041* (2013.01); *G06F 3/0416* (2013.01)

(58) Field of Classification Search
None
See application file for complete search history.

(56) References Cited

U.S. PATENT DOCUMENTS

2013/0307441 A1* 11/2013 Schuster ................. B06B 1/023
                                                                318/127
2017/0090577 A1*  3/2017 Rihn ..................... A63F 13/285

FOREIGN PATENT DOCUMENTS

| JP | 2003199974 | 7/2003 |
| JP | 2010287232 | 12/2010 |
| JP | 2011-097747 A | 5/2011 |
| JP | 2011-165172 A | 8/2011 |
| JP | 2017-211820 | 11/2017 |

* cited by examiner

*Primary Examiner* — Thomas S McCormack
(74) *Attorney, Agent, or Firm* — Antony P. Ng; Russell Ng PLLC

(57) ABSTRACT

A haptic feedback system configured to apply an impact to an electronic device is provided. The haptic feedback system includes a haptic actuator that makes reciprocating motion, a drive circuit that applies to the haptic actuator a drive voltage composed of a predetermined number of basic pulse voltages for acceleration, and a controller that controls an average voltage of a subset of the basic pulse voltages.

18 Claims, 10 Drawing Sheets

HAPTIC FEEDBACK SYSTEM FOR AN ELECTRONIC DEVICE

PRIORITY CLAIM

The present application claims benefit of priority under 35 U.S.C. §§ 120, 365 to the previously filed Japanese Patent Application No. JP2017-099124 with a priority date of May 18, 2017, which is incorporated by reference herein.

TECHNICAL FIELD

The present invention relates to haptic feedback systems in general, and in particular to a technique for adjusting the strength of haptic feedback of impact applied to an electronic device by a haptic actuator.

BACKGROUND

An electronic device having chassis or a touch screen touched by a user when used, such as a tablet terminal, a smartphone, a mobile phone, or a computer, may be equipped with an actuator (haptic actuator) to give haptic feedback to a human body. The haptic actuator transmits vibration to a vibrating body such as the touch screen or the chassis according to an event generated by a system. The user perceives vibration in a human body region in contact with the vibrating body or perceives the vibration as sound. The haptic actuator uses electric power as a drive source and can be divided roughly into an impact type and a vibration type depending on the nature of vibration.

Representative examples of the impact type can include a Shape Memory metal Impact Actuator (SIA) using shape-memory alloy and a piezoelectric actuator using a piezoelectric element. The impact type uses a vibration element to hit a chassis or a keyboard plate so as to apply transient vibration. Representative examples of the vibration type can include an ERM (Eccentric Rotating Mass) actuator using an eccentric motor, a linear resonant actuator (LRA) which causes an alternating current to flow through a coil in a magnetic field so as to vibrate a mover, and the like. The vibration type applies vibration with a constant amplitude for a time necessary for the vibrating body to vibrate.

A vibration actuator, for example, may includes a mover linearly vibrates in a surface direction in cooperation with a coil and a magnet by the application of a rectangular-wave or sine-wave current to the coil fixed to a chassis. A PWM-controlled drive signal is supplied to a haptic actuator using a piezoelectric element, a voice coil, or a solenoid to adjust the intensity of vibration.

In general, the LRA is so used that an alternating pulse voltage with a frequency close to a resonant frequency will be applied to a mover to vibrate in a steady state. It is also considered that the LRA is used as an impact type using a transient vibration region immediately after pulse voltage is applied. When five to six pulse voltages with a large amplitude are applied to the LRA, large vibration occurs in a short time to enable a user to feel the impact. Since the bodily sensation of haptic feedback is different from individual to individual, it is desired that the magnitude of impact can be adjusted for each user. One method of changing the magnitude of impact is to change the amplitude of each pulse voltage, but a circuit for performing the continuously changing of the amplitude can be very large in scale.

Consequently, it would be preferable to provide an improved haptic feedback system to apply impact to an electronic device.

SUMMARY

In accordance with an embodiment of the present disclosure, a haptic feedback system includes a haptic actuator that makes a reciprocating motion, a drive circuit that applies to the haptic actuator a drive voltage composed of a predetermined number of basic pulse voltages for acceleration, and a controller that controls an average voltage of a smaller number of basic pulse voltages than the predetermined number of basic pulse voltages. The average voltage of the basic pulse voltages corresponds to a value obtained by time-integrating the basic pulse voltages over a half cycle, and any one or more of factors, that is, the pulse width of a basic pulse voltage, the pulse height value, and a duty ratio of a small pulse voltage when the basic pulse voltage is composed of small pulse voltages subjected to switching control are adjusted to enable control.

All features and advantages of the present disclosure will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION

I. Haptic Actuator

Figure 1A:
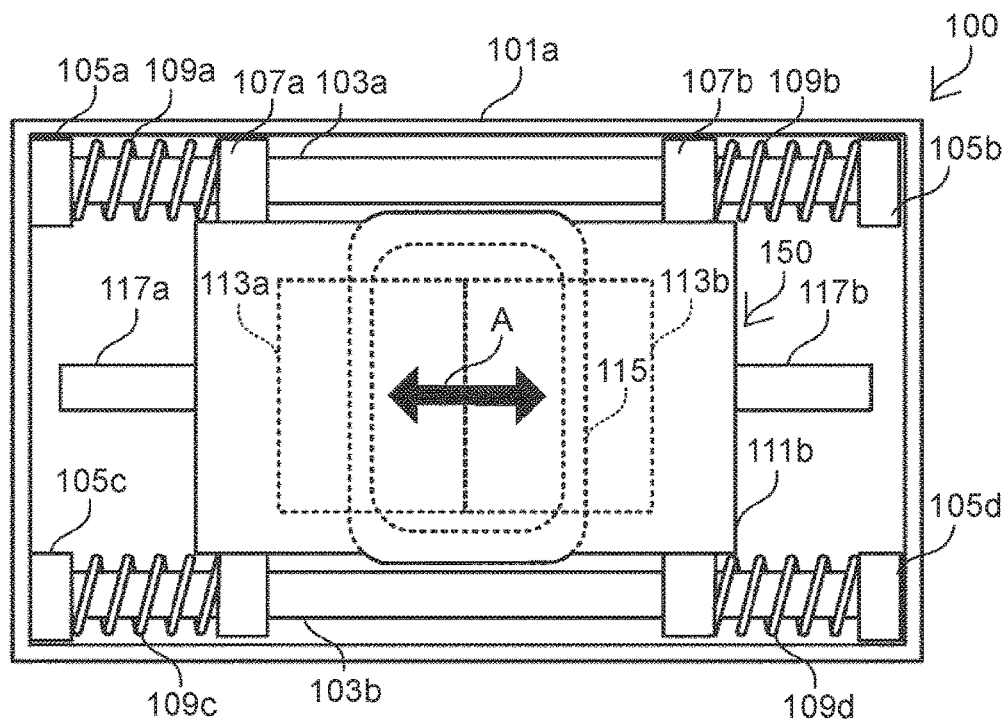
FIGS. 1A and 1B are a plan view and a sectional view of an actuator, respectively.
Figure 1B:
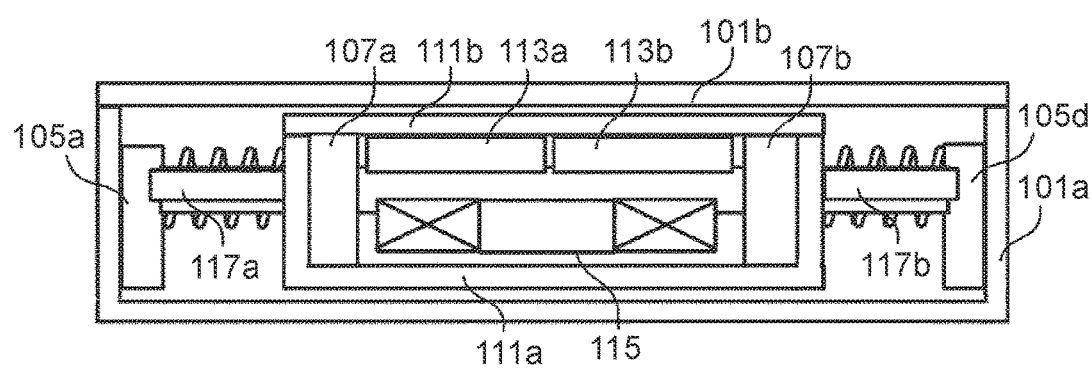

FIGS. 1A-1B are diagrams of the structure of a haptic actuator, according to one embodiment. In the embodiment, description will be made by taking, as an example, a dual-mode actuator 100 operating in a vibration, mode using steady-state vibration and an impact mode using transient vibration, but a single-mode actuator operating in the impact mode alone can also be adopted. In the impact mode, for example, a transient, strong vibration is applied to a touch screen to enable a user to feel typing on a software keyboard. In the vibration mode, for example, the chassis is vibrated for a relatively long time necessary for the user to become aware of the arrival of a mail or a push notification from a website.

Switching between the vibration mode and the impact mode can be performed by controlling an alternating pulse voltage applied to the actuator 100. In the impact mode, a predetermined number of (five to seven as an example) pulse voltages are applied. In the vibration mode, a pulse voltage whose amplitude and frequency are constant is applied for a time required for steady-state vibration. The amplitude of the pulse voltage applied in the vibration mode is smaller than the amplitude of the pulse as voltages applied in the impact mode. Further, in both the impact mode and the vibration mode, the pulse voltage frequency is close to the frequency of a mover 150, but it can adopt values different between both modes.

In the impact mode, the vibration amplitude and vibration acceleration of a vibrating body is larger than those in the vibration mode. The actuator 100 adopts the LRA principle, where a vibration mechanism including the mover 150 is housed inside a lower chassis 101a and an upper chassis 101b. FIG. 1A is a plan view when the upper chassis 101b is removed, and FIG. 1B is a sectional view cut along a center line in the longitudinal direction.

Both ends of shafts 103a and 103b provided on both sides are fixed to the lower chassis 101a through fixtures 105a to 105d, respectively. The shafts 103a and 103b penetrate through both ends of spindles 107a, 107b to enable the spindles 107a, 107b to make reciprocating linear motion. Compression coil springs 109a to 109d are provided between the fixtures 105a to 105d and the spindles 107a, 107b, respectively. Magnets 113a and 113b different in magnetic pole direction from each other are attached to the lower surface of an upper yoke 111b. A coil 115 is arranged in a coil space formed by the upper yoke 111b and a lower yoke 111a.

The coil 115 is fixed to the lower chassis 101a by an unillustrated fixing member. The magnetic flux radiated from each of the magnets 113a, 113b flows through a magnetic path made up of the upper yoke 111b, the lower yoke 111a, and the coil space. Shafts 117a and 117b are fixed to the end faces of the lower yoke 111a: in the vibration direction. The upper yoke 111b, the lower yoke 111a, the spindles 107a, 107b the magnets 113a, 113b, and the shafts 117a, 117b constitute the mover 150. Note that the actuator 100 may also be such that the mover includes a coil, and the magnets and the yokes are fixed to the lower chassis 101a.

When an alternating current (drive current) having a frequency corresponding to a resonant frequency of the mover 150 flows through the coil 115 in the vibration mode of the actuator 100, the mover 150 makes reciprocating linear motion in the direction of arrow A to vibrate by the Lorentz force generated in the coil 115 due to a magnetic field formed by the magnets 113a, 113b, and the elastic forces of the compression coil springs 109a to 109d. The vibration caused by the reciprocating motion of the mover 150 is propagated to the lower chassis 101a and the upper chassis 101b.

The amplitude of the mover 150 in the vibration mode is so set that the distal ends of the shafts 117a and 117b will not come into contact with the inner surface of the lower Chassis 101a. The amplitude of the mover 150 in the impact mode is larger than the amplitude in the vibration mode. As one example, the structure can be such that the distal ends of the shafts 117a and 117b will collide with the lower chassis 101a in the impact mode.

Figure 2:
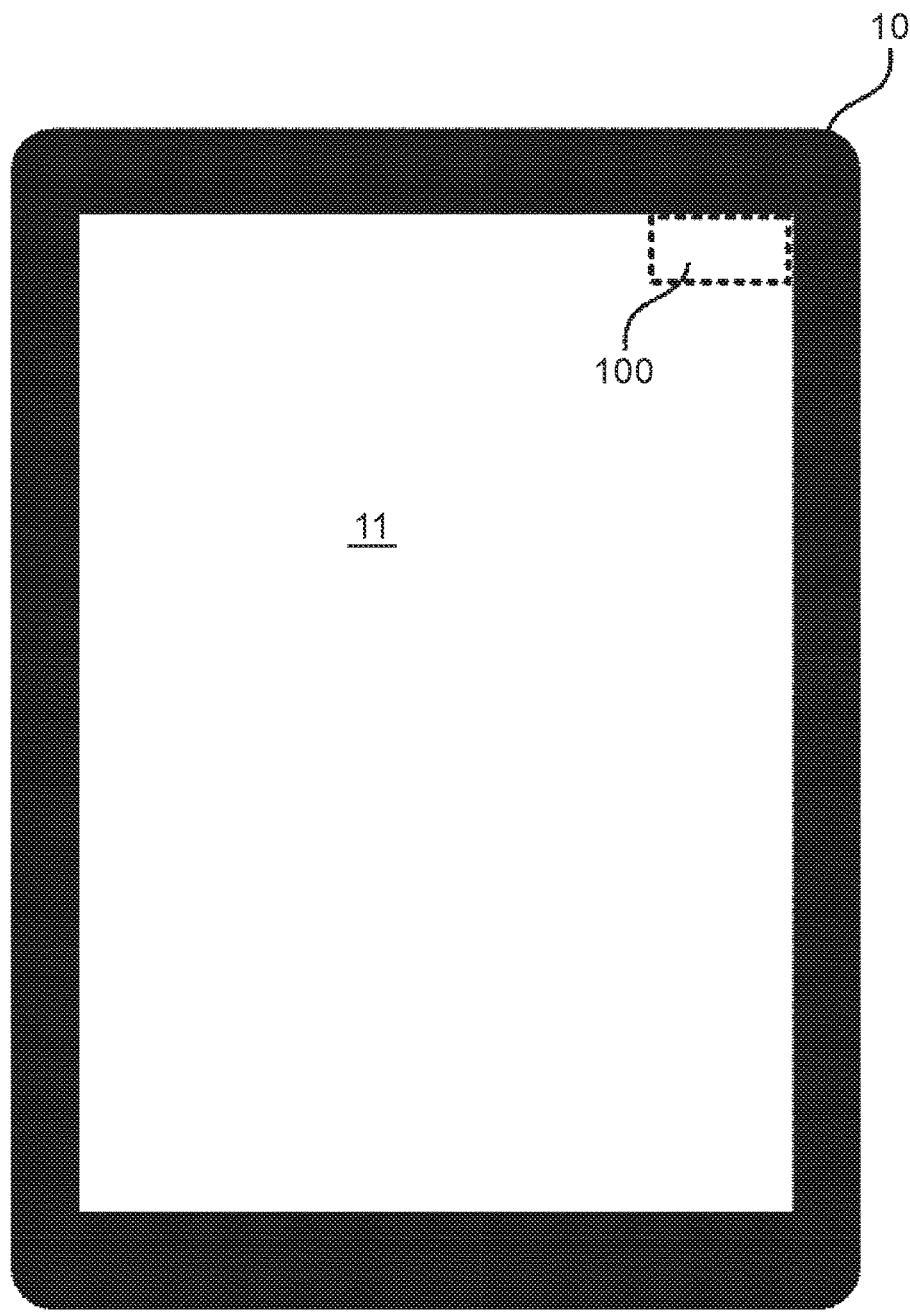
FIG. 2 is a plan view of a smartphone equipped with the actuator from FIG. 1.

In the case of a structure in which the shafts 117a and 117b will not collide with the lower chassis 101a, the shafts 117a and 117b do not need to be provided. For example, as illustrated in FIG. 2, the actuator 100 can be attached to the chassis of the smartphone 10 or the inside of the touch screen 11. Note that the structure of the actuator 100 illustrated in FIG. 1 is just one example, and the arrangement and structures of the mover, the yokes, the magnets, the compression coil springs, and the like, and the number of respective components do not particularly limit the present invention.

II. Haptic Feedback System

Figure 3:
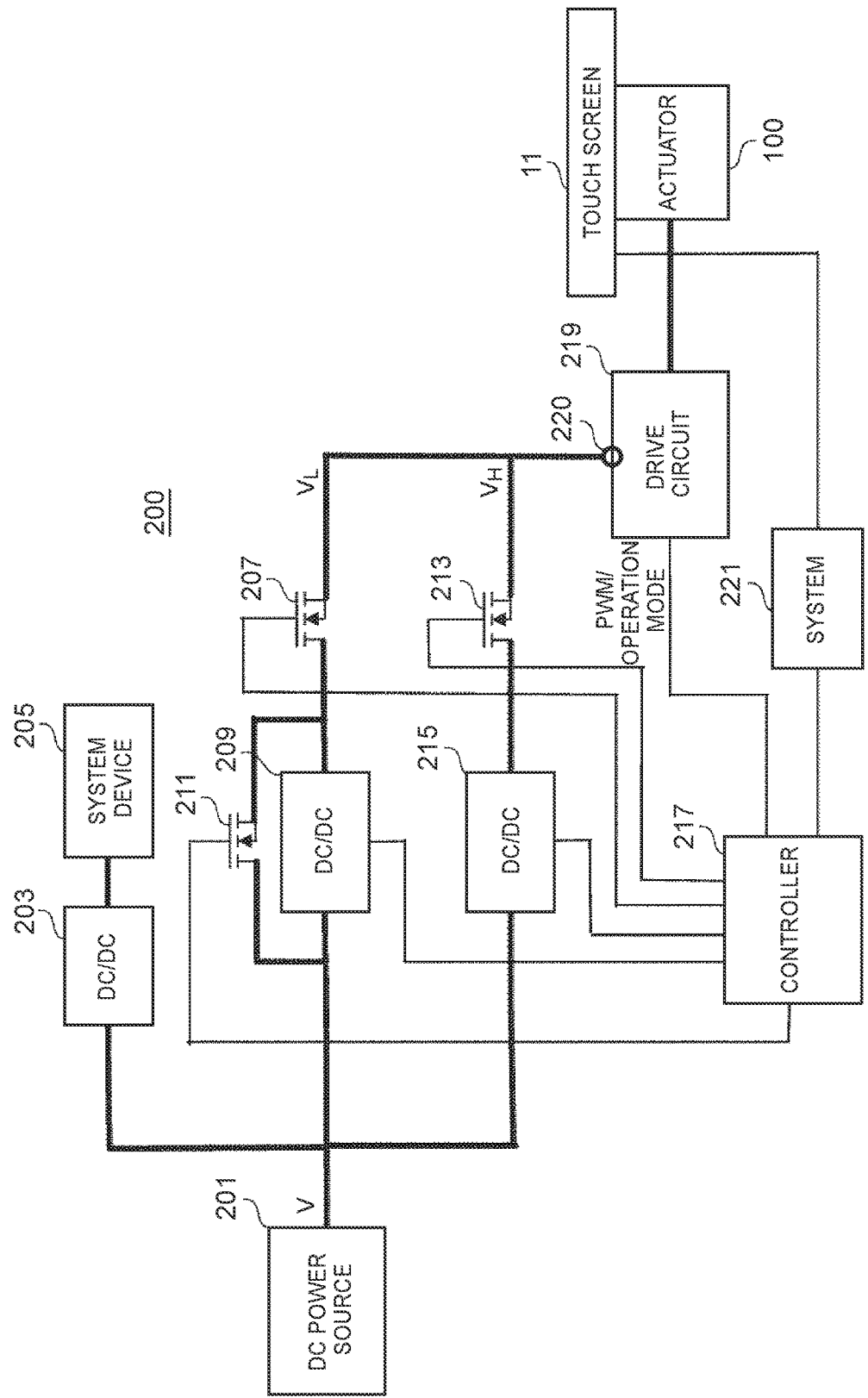
FIG. 3 is a functional block diagram of a haptic feedback system.

FIG. 3 is a functional block diagram of a haptic feedback system 200 mounted in a smartphone 10. The haptic feedback system 200 can also be mounted in any other electronic device equipped with a touch screen, such as a tablet terminal or an ATM, as well as the smartphone. In FIG. 3, the thick line indicates a power line and the thin line indicates a signal line. In one example, a DC power source 201 is composed of a single-cell lithium-ion battery, a battery controller, a charger, and the like.

A voltage regulator 203 converts output voltage V of the DC power source 201 into plural working voltages required by a system device 205. The system device 205 is composed of a semiconductor chip (SoC) having functions such as a CPU, a system memory, and an I/O interface, a camera, a speaker, the touch screen 11, an I/O device such as a wireless module, and the like. Note that the hardware of a system 221 is configured by the system device 205.

A DC voltage VH is applied to a common input terminal 220 of a drive circuit 219 in the impact mode, while a DC voltage VL is applied in the vibration mode. The drive circuit 219 is a DC/AC inverter which converts DC voltage VH, VL to AC drive voltage, and applies the AC drive voltage to the coil 115 of the actuator 100. A sign wave, a triangular wave, a rectangular wave, or the like can be adopted as the waveform of the drive voltage, and there is no need to particularly limit the waveform. Further, the waveform in the impact mode and the waveform in the vibration mode may be identical to or different from each other.

The drive circuit 219 outputs, in the impact mode, a drive voltage generated from the DC voltage VH without stepping down or stepping up the voltage inside thereof, and outputs a drive voltage generated from the DC voltage VL in the vibration mode. Therefore, the amplitude of the drive voltage applied in the impact mode is larger than the amplitude of the drive voltage applied in the vibration mode. The drive circuit 219 can also receive only the DC voltage VH at the input terminal 220 to output a drive voltage having an amplitude suitable for the vibration mode after being stepped down by PWM control. However, since a larger power loss occurs as the difference between input voltage and output voltage is larger when the switching regulator converts the voltage, if the DC voltages VH, VL unnecessary to be converted to the drive voltage inside thereof, the drive circuit 219 can operate efficiently.

A bypass switch 211 supplies the output voltage V of the DC power source 201 directly to the drive circuit 219 as the DC voltage VL. When the output voltage V of the DC power source 201 is decreased to such a value that the actuator 100 cannot generate sufficient vibration in the vibration mode, a booster 209 boosts the voltage to be applied to the drive circuit 219. When the drive circuit 219 can drive the actuator 100 properly in a voltage range of the DC power source 201, the booster 209 may not be provided.

A booster 215 boosts the output voltage V of the DC power source 201 to the DC voltage VH and supplies the DC voltage VH to the drive circuit 219. A switch 207 becomes on-state when the actuator 100 operates in the vibration mode and off-state when the actuator 100 operates in the impact mode. A switch 213 becomes on-state when the actuator 100 operates in the impact mode and off-state when the actuator 100 operates in the vibration mode.

In response to a haptic command received from the system 221 and the output voltage V of the DC power source 201, a controller 217 controls the operation of the switches 207, 211, 213, the boosters 209, 215, and the drive circuit 219. The controller 217 sends the drive circuit 219 a signal to instruct the drive circuit 219 about the impact mode or the vibration mode, and a signal for PWM-control of basic pulse voltages in the case of the impact mode.

The system 221 is configured in hardware such as the system device 205 in cooperation with software such as a device driver, an OS, and applications. The system 221 gives the timing of generating haptic feedback and notifies the controller 217 of a haptic command including an identifier of the impact mode or the vibration mode. Further, the system 221 provides the touch screen 11 with a user interface for adjusting vibration intensity to be described later.

III. Drive Voltage Applied in Vibration Mode

Figure 4:
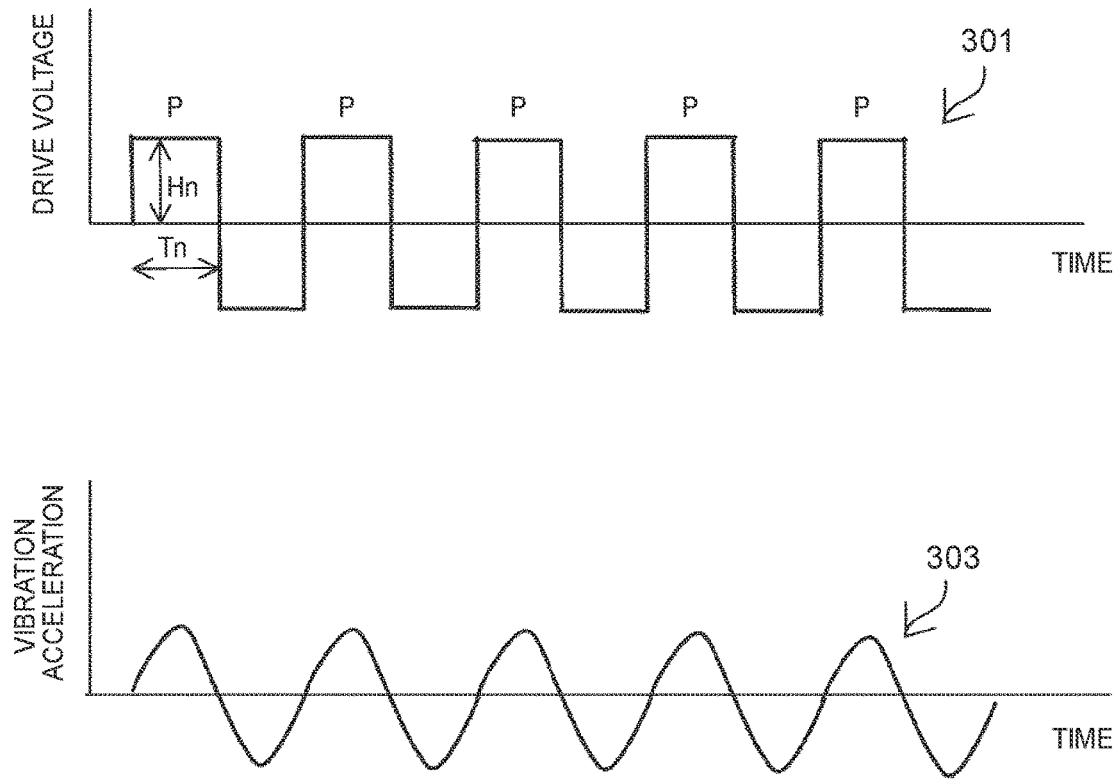
FIG. 4 is a chart describing a state in which the actuator from FIG. 1 operates in a vibration mode.

FIG. 4 is a chart describing a state in which the actuator 100 operates in the vibration mode. A drive voltage 301 is composed of continuous AC basic pulse voltages P generated by the drive circuit 219 from the DC voltage VL. A vibration waveform 303 indicates acceleration generated in the chassis of the smartphone 10 in a direction of the vibration axis of the actuator 100.

The amplitude Hn of basic pulse voltages is set constant, and the frequency (cycle 2Tn) is set to the value of the resonant frequency of the mover 150 or a value close thereto. When the actuator 100 passes a transient state immediately after the drive voltage 301 is applied, the mover 150 vibrates with an approximately constant amplitude and the frequency of the drive voltage 301. This state is called a steady state of the actuator 100. In the steady state, the maximum vibration acceleration of the actuator 100 is a constant value corresponding to the amplitude Hn. The controller 217 can control the vibration acceleration in the steady state by switching control of all the basic pulse voltages P using small pulse voltages S illustrated in FIG. 6.

IV. Drive Voltage Applied in Impact Mode

Figure 5:
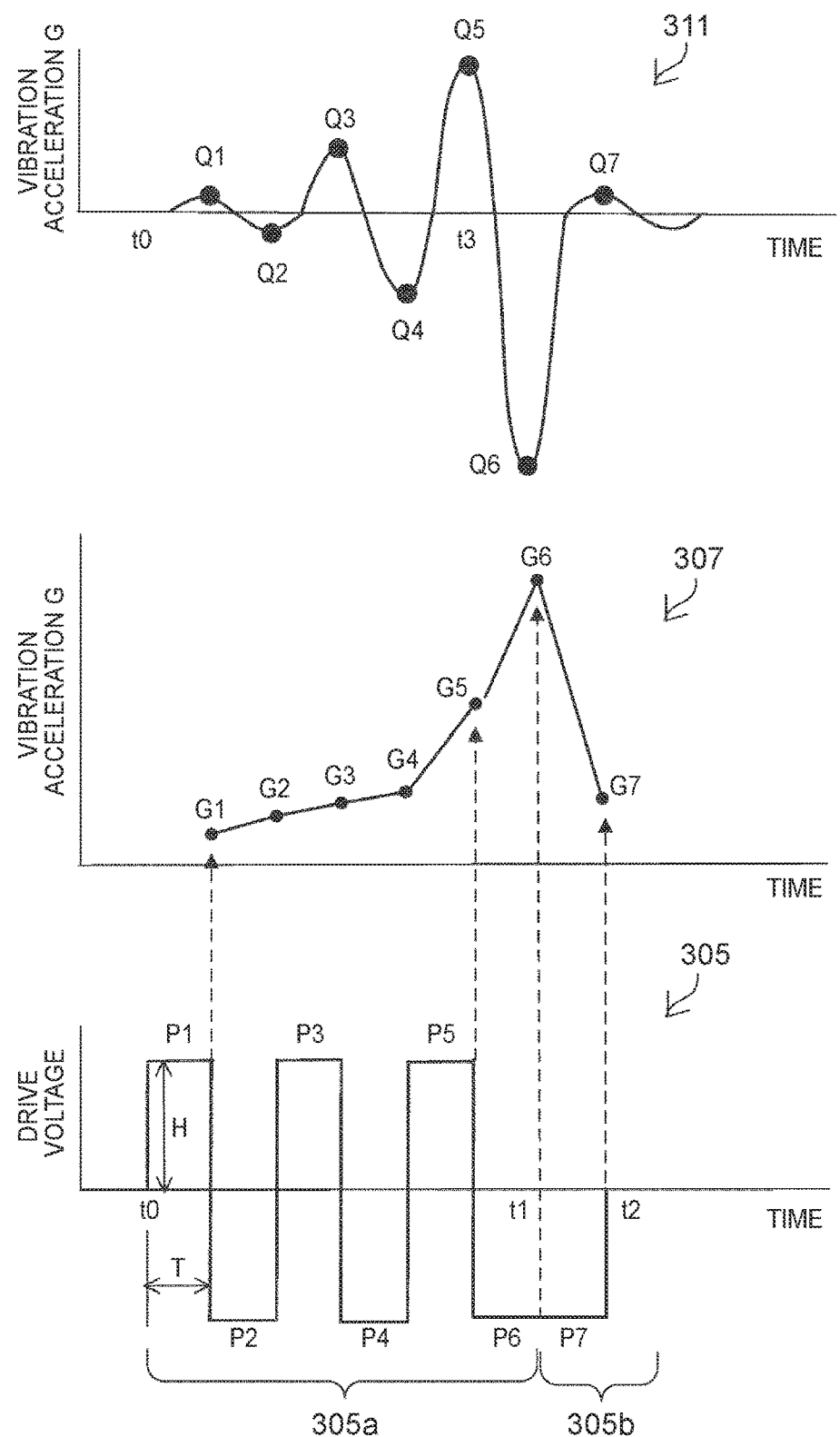
FIG. 5 is a chart describing a state in which the actuator from FIG. 1 operates in an impact mode.

FIG. 5 is a chart describing a state in which the actuator 100 operates in the impact mode. A drive voltage 305 is composed of seven AC basic pulse voltages P1 to P7 generated by the drive circuit 219 from the DC voltage VH. The drive voltage 305 includes six basic pulse voltages P1 to P6 for acceleration, and a basic pulse voltage P7 for deceleration, which follows the basic pulse voltage P6.

Hereinafter, the basic pulse voltages P1 to P6 used for acceleration are called accelerating pulse voltages 305a, and the basic pulse voltage P7 used for deceleration is called a decelerating pulse voltage 305b. The actuator 100 gets the maximum vibration acceleration G6 at the last basic pulse voltage P6 among the accelerating pulse voltages 305a. The number of accelerating pulse voltages 305a is not particularly limited, but it is desired that the number of accelerating pulse voltages should be as small as possible in consideration of impact's haptic feedback. Further, the number of decelerating pulse voltages 305b may also be two or more.

The amplitude H of the drive voltage 305 is set constant, and the frequency (cycle 2T) can be determined from a range between the resonant frequency and a frequency about 10% higher than the resonant frequency based on the inertia of the mover 150, the spring constants of the compression coil springs 109a to 109d, and the like. An acceleration waveform 311 marks peak values Q1 to Q7 at the maximum amplitude positions of the mover 150 vibrating to the right and left. A vibration acceleration 307 corresponds to a peak-to-peak value of the acceleration waveform 311 to indicate transient vibration acceleration in the direction of the vibration axis of the actuator 100 generated in the chassis of the smartphone 10 when the drive voltage 305 is applied at time t0 and the application thereof is stopped at time t2.

In this example, the first basic pulse voltage P1 is applied at time t0. Then, when subsequent basic pulse voltages P2 to P5 are applied, the vibration acceleration and the vibration frequency gradually increase as the vibration acceleration increasing from G1 to G6, and the vibration frequency almost reaches the resonant frequency at time t1 when the basic pulse voltage P6 is applied so that desired vibration acceleration (maximum vibration acceleration) G6 can be obtained. The number of basic pulse voltages required to obtain the maximum vibration acceleration G6 can be pre-determined for each actuator.

After time t2, if the application of the accelerating pulse voltages 305a is continued, the actuator 100 will eventually make a transition to the vibration mode to vibrate in the steady state. However, since the pulse height value of the drive voltage is VH, the vibration acceleration in this case is larger than the vibration acceleration in the vibration mode when the drive voltage having the pulse height value VL is applied. A person will feel, with a finger tip, short-time strong vibration generated from time t0 to time t1 as transient vibration, that is, as impact. When the decelerating pulse voltage 305b is not applied, since the vibration force is lost after time t1, the mover 150 vibrates freely (residual vibration).

In the impact mode, it is desired that the vibration should be stopped immediately after the impact occurs to be able to respond to high-speed typing. To this end, the residual vibration needs to be forced to attenuate in a short time. After completion of the application of the predetermined accelerating pulse voltages 305a at time t1, the controller 217 applies, as a braking voltage, the decelerating pulse voltage 305b whose phase is advanced by 180 degrees with respect to the frequency of the accelerating pulse voltages 305a to attenuate the residual vibration in a short time.

In the haptic feedback of the impact felt by the user, the magnitude of the maximum vibration acceleration G6 is dominant. The maximum vibration acceleration occurs when the last basic pulse voltage of the accelerating pulse voltages 305a is applied. In the drive voltage 305, the number of accelerating pulse voltages 305b is so adjusted that the maximum vibration acceleration can be adjusted in a range of discrete vibration accelerations G1 to G6, but it is convenient if the maximum vibration acceleration can be adjusted finely to suit, user's taste.

V. Adjustment of Maximum Vibration Acceleration G6

Figure 6:
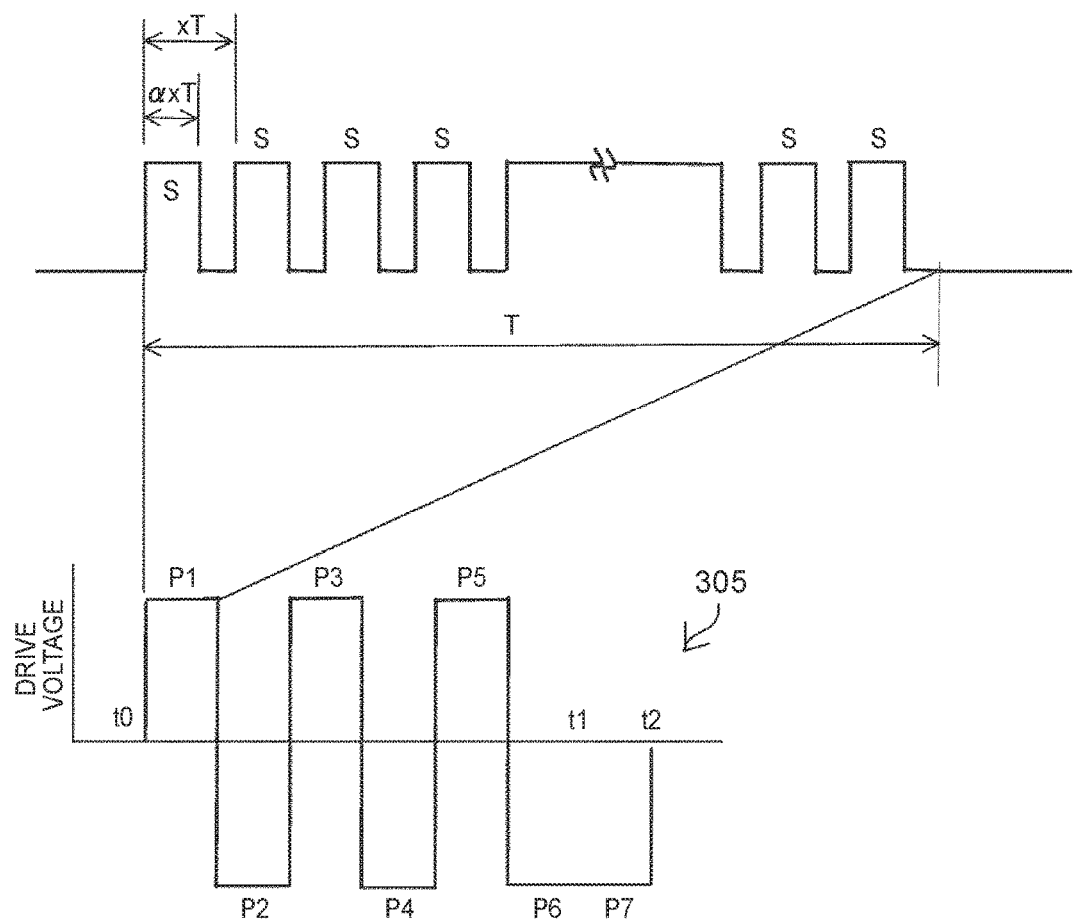
FIG. 6 is a chart describing a state of PWM-controlling a first basic pulse voltage P1, applied in the impact mode, by using a small pulse voltage.

In an experiment, it is found that the maximum vibration acceleration G6 cannot be adjusted smoothly with the duty ratio α when PWM-control is so performed that all basic pulse voltages P1 to P6 that constitute the accelerating pulse voltages 305a will become small pulse voltages with a predetermined duty ratio. In the embodiment, as illustrated in FIG. 6 as one example, PWM control is so performed that only the first basic pulse voltage P1 will become a small pulse voltage S to reduce the average voltage.

To distinguish such PWM control from a method of PWM-controlling an on-duty ratio of the basic pulse voltage, it is expressed that the basic pulse voltage is PWM-controlled by using the small pulse voltage S. If the cycle of the small pulse voltage S is denoted by xT (x<1) with respect to half cycle T of the basic pulse voltage P1, the basic pulse voltage P1 can be PWM-controlled by using 1/x number of small pulse voltages S. When the duty ratio of the small pulse voltage S is denoted by $\alpha$, the pulse width of the small pulse voltage S is $\alpha \times T$.

Figure 7:
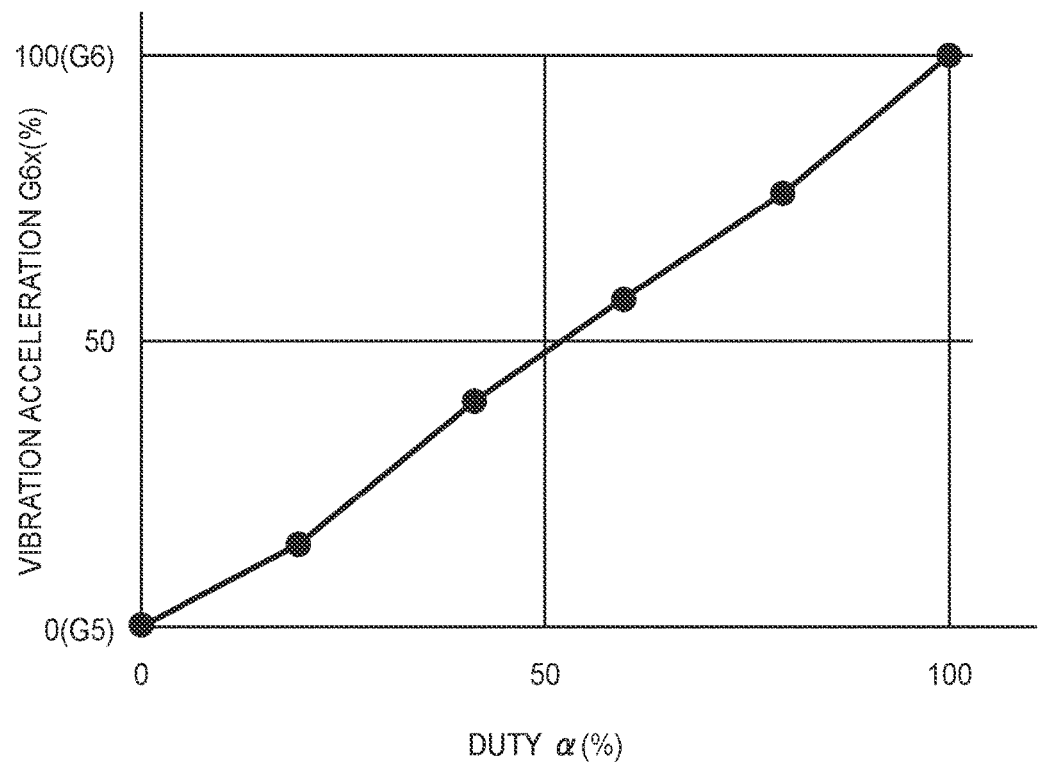
FIG. 7 is a chart illustrating a relationship between duty ratio α and vibration acceleration G6x when the basic pulse voltage P1 is PWM controlled.

FIG. 7 illustrates the experimental results of vibration acceleration G6x varying between the maximum vibration acceleration G6 and the vibration acceleration G5 by changing the duty ratio $\alpha$ of the small pulse voltage S. Here, the vibration acceleration G6x when the duty ratio $\alpha$ is 0% corresponds to the maximum vibration acceleration G5 generated by five basic pulse voltages, and the vibration acceleration G6x when the duty ratio $\alpha$ is 100% corresponds to the maximum vibration acceleration G6 generated by six basic pulse voltages.

In the experiment, as one example, the frequency of the drive voltage 305 is set to 156 Hz, and the frequency of the small pulse voltage S is set to 10 KHz. Suppose that the duty ratio $\alpha$ of the small pulse voltage S is changed from 0% to 100%. In this case, when the duty ratio $\alpha$ is 50%, the vibration acceleration G6x is almost 50%, and the vibration acceleration G6x varies in a state close to a straight line as a whole. Thus, the vibration acceleration G6x can be adjusted smoothly in a range from the vibration acceleration G5 to the maximum vibration acceleration G6 by changing the duty ratio $\alpha$ of the first basic pulse voltage P1.

The system 221 can display, on the touch screen 11, a slide bar for 0% to 100% corresponding to the duty ratio $\alpha$. If the user touches a button on the slide bar to set a duty ratio $\alpha$ in the controller 217, the user can intuitively recognize and adjust the strength of impact from the position of the button on the slide bar.

Figure 8:
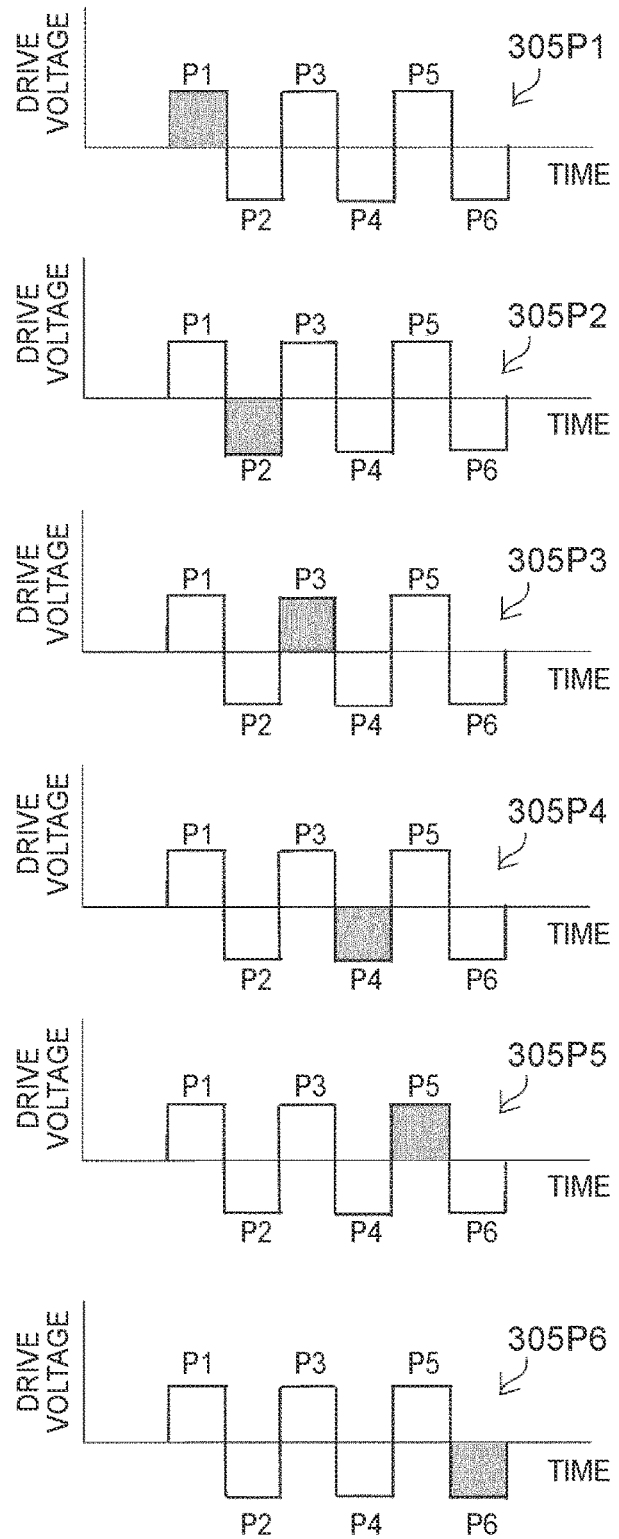
FIG. 8 is a chart describing an example of basic pulse voltages P1 to P6 whose average voltage is controlled.

FIG. 8 is a chart describing an experimental method carried out to verify a range of basic pulse voltages P1 to P6 whose average voltage is controlled by PWM control, where each of drive voltages 305P1 to 305P6 indicates that only any one basic pulse voltage of six accelerating pulse voltages 305a is PWM-controlled by using the small pulse voltage S. For example, the drive voltage 305P2 indicates that only the basic pulse voltage P2 is PWM controlled by using the small pulse voltage S while the other basic pulse voltages P1, and P3 to P6 remain as the basic pulse voltages. The drive voltage 305P1 in which only the first basic pulse voltage P1 is PWM-controlled agrees with the drive voltage 305 in FIG. 6.

Figure 9:
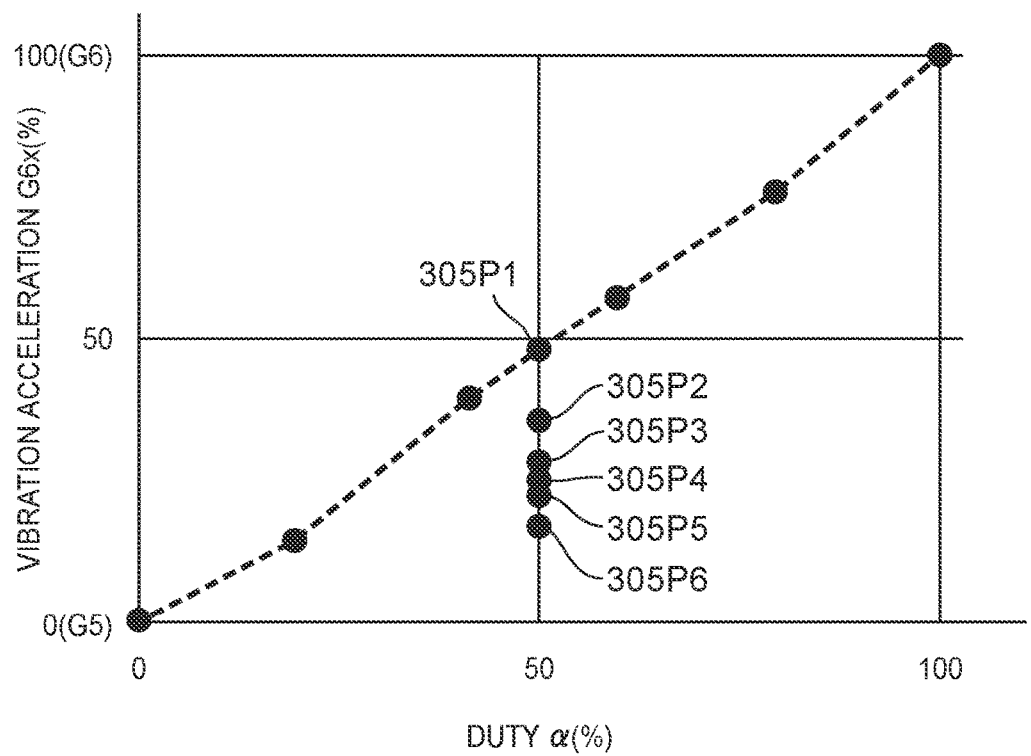
FIG. 9 is a chart illustrating the vibration acceleration G6x with a duty ratio of 50% when the basic pulse voltages P1 to P6 are PWM controlled.

FIG. 9 illustrates the experimental results in this case. FIG. 9 is a chart of the vibration acceleration G6x plotted in FIG. 7 when the duty ratio $\alpha$ of each of basic pulse voltages to be PWM controlled in all the drive voltages 305P1 to 305P6 is set to 50%. If the vibration acceleration G6x when the duty ratio $\alpha$ is set to 50% is 50%, since the duty ratio $\alpha$ set to any percentage from 0% to 100% and the vibration acceleration. G6x (%) are approximately proportional to each other, the user can easily seta vibration intensity recognized from the position of the button on the slide bar displayed on the touch screen 11.

FIG. 9 indicates that the vibration acceleration G6x becomes smaller as the basic pulse voltage to be PWM controlled is closer to the last basic pulse voltage P6. In this case, however, the obtained vibration acceleration G6x does not become unstable unlike the case where all the basic pulse voltages P1 to P6 are PWM-controlled. The magnitude of the duty ratio $\alpha$ set for each basic pulse voltage is proportional to energy consumed when the basic pulse voltage is applied to vibrate the mover 150.

When the duty ratios $\alpha$ of basic pulse voltages to be controlled are both 50% and the basic pulse voltages consume the same energy, the vibration acceleration G6x obtained at the drive voltage 305P6 is smaller than that obtained at the drive voltage 305P1. Thus, the energy efficiency when the vibration acceleration G6x is adjusted increases as a basic pulse voltage closer to the first one is PWM-controlled. The reason why the vibration acceleration G6x (%) becomes closer to the duty ratio $\alpha$ when an average voltage of basic pulse voltages close to the first one is controlled despite of the fact that the basic pulse voltages P1 to P6 PWM controlled with the same duty ratio $\alpha$ supply, to the actuator 100, equal energy or an equal vibration force, respectively, can be inferred as follows.

Although the vibration frequency of the mover 150 immediately after the vibration is started is deviated largely from the resonant frequency, the vibration frequency gets closer to the frequency of the drive voltage, i.e., the resonant frequency as the number of applied basic pulse voltages increases and reaches almost the resonant frequency when the last basic pulse voltage P6 is applied. It is considered that a change in vibration force applied to the mover 150 which vibrates at a vibration frequency close to the resonant frequency affects the vibration acceleration to a greater degree than a change in vibration force applied to the mover 150 which vibrates at a vibration frequency deviated from the resonant frequency.

When all the basic pulse voltages P1 to P6 are PWM-controlled by the small pulse voltage S, the vibration acceleration G6x obtained by changing the duty ratio $\alpha$ becomes unstable. In this case, it is considered that the reason why the instability is resolved by PWM-controlling only any one of the basic pulse voltages is because the vibration of the mover 150 is greatly affected as the amount of harmonic component generated in the PWM-controlled basic pulse voltages by ringing increases.

From various experiments and studies, it is found that the vibration acceleration G6x can be adjusted with the duty ratio $\alpha$ under such conditions that the number of basic pulse voltages to be PWM-controlled is set to a number smaller than the number of accelerating pulse voltages 305a, and basic pulse voltages as close to the first one as possible are targeted for control. In this case, the number of basic pulse voltages to be PWM-controlled may be two or more. In the embodiment, there is no need to limit the switching control method to the PWM control, and PFM control can also be adopted.

Figure 10:
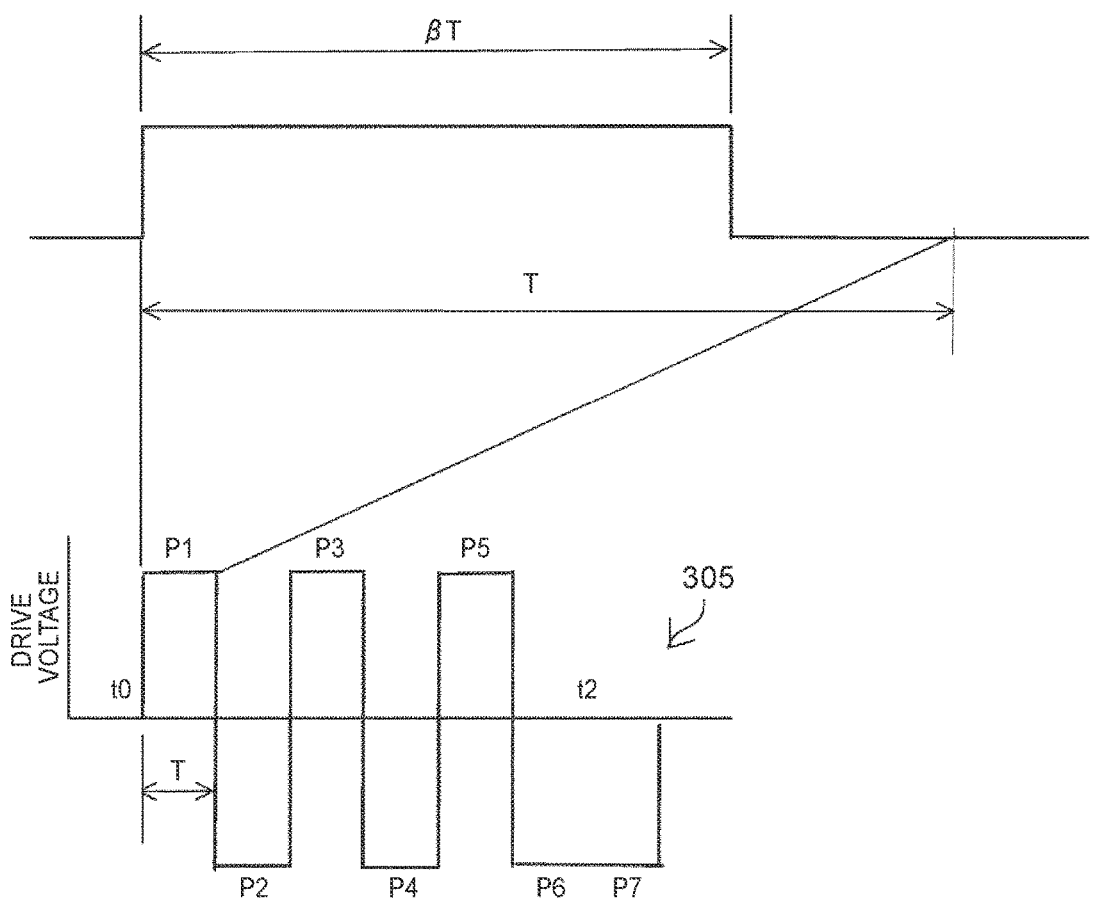
FIG. 10 is a chart describing a method of PWM-controlling the pulse width of the basic pulse voltage P1.

FIG. 10 is a chart describing a method of PWM-controlling the pulse width of each basic pulse voltage. FIG. 10 illustrates a state in which a basic pulse voltage in half cycle T is PWM-controlled with a duty ratio $\alpha$. If the pulse width of the basic pulse voltage is PWM-controlled, the switching loss can be decreased with less ringing, compared with the case where the basic pulse voltage is PWM-controlled by the small pulse voltage S as in FIG. 6.

As has been described, the present invention provides an improved haptic feedback system.

While the invention has been particularly shown and described with reference to a preferred embodiment, it will be understood by those skilled in the art that various changes in form and detail may be made therein without departing from the spirit and scope of the invention.

What is claimed:

1. A haptic feedback system comprising:
    a haptic actuator makes a reciprocating motion;
    a controller, in response to a haptic command, sends a signal corresponding to one of a vibration mode and an impact mode; and
    a drive circuit applies, to said haptic actuator,
        a first drive voltage having a predetermined number of basic pulse voltages for acceleration, in response to said signal corresponding to said vibration mode; and
        a second drive voltage having a set of accelerating pulse voltages and a decelerating pulse voltage immediately following said set of accelerating pulse voltages; in response to said signal corresponding to said impact mode.

2. The haptic feedback system of claim 1, wherein said vibration mode provides a steady-state vibration, and said impact mode provides a transient vibration stronger than said steady-state vibration.

3. The haptic feedback system of claim 1, wherein said vibration mode alerts a user an arrival of an e-mail.

4. The haptic feedback system of claim 1, wherein said impact mode allows a user to feel typing on a soft keyboard.

5. The haptic feedback system of claim 1, wherein said first drive voltage includes continuous AC pulse voltages generated by said drive circuit from a first DC voltage.

6. The haptic feedback system of claim 5, wherein said second drive voltage includes a set of AC pulse voltages generated by said drive circuit from a second DC voltage, wherein said second DC voltage is higher than said first DC voltage.

7. The haptic feedback system of claim 6, wherein a last one of said AC pulse voltages in said second drive voltage is for deceleration, while the remaining of said AC pulse voltages in said second drive voltage is for acceleration.

8. An electronic device, comprising:
    a touch screen; and
    a haptic feedback system includes
        a linear actuator applies an impact to said touch screen;
        a controller, in response to a haptic command, sends a signal corresponding to one of a vibration mode and an impact mode; and
        a drive circuit applies, to said linear actuator,
            a first drive voltage having a predetermined number of basic pulse voltages for acceleration, in response to said signal corresponding to said vibration mode; and
            a second drive voltage having a set of accelerating pulse voltages and a decelerating pulse voltage immediately following said set of accelerating pulse voltages, in response to said signal corresponding to said impact mode.

9. A method, comprising:
    in response to a haptic command, sending a signal corresponding to one of a vibration mode and an impact mode for controlling a vibration intensity of an impact of a haptic actuator that makes a reciprocating motions;
    in response to said signal corresponding to said vibration mode, applying to said haptic actuator a first drive voltage having a predetermined number of accelerating basic pulse voltages; and
    in response to said signal corresponding to said impact mode, applying to said haptic actuator a second drive voltage having a set of accelerating pulse voltages and a decelerating pulse voltage immediately following said set of accelerating pulse voltages.

10. The method of claim 9, wherein said first drive voltage includes continuous AC pulse voltages generated by said drive circuit from a first DC voltage.

11. The method of claim 10, wherein said second drive voltage includes a set of AC pulse voltages generated by said drive circuit from a second DC voltage, wherein said second DC voltage is higher than said first DC voltage.

12. The method of claim 11, wherein a last one of said AC pulse voltages in said second drive voltage is for deceleration, while the remaining of said AC pulse voltages in said second drive voltage is for acceleration.

13. The electronic device of claim 8, wherein said vibration mode provides a steady-state vibration, and said impact mode provides a transient vibration stronger than said steady-state vibration.

14. The electronic device of claim 8, wherein said vibration mode alerts a user an arrival of an e-mail.

15. The electronic device of claim 8, wherein said impact mode allows a user to feel typing on a soft keyboard.

16. The electronic device of claim 8, wherein said first drive voltage includes continuous AC pulse voltages generated by said drive circuit from a first DC voltage.

17. The electronic device of claim 16, wherein said second drive voltage includes a set of AC pulse voltages generated by said drive circuit from a second DC voltage, wherein said second DC voltage is higher than said first DC voltage.

18. The electronic device of claim 17, wherein a last one of said AC pulse voltages in said second drive voltage is for deceleration, while the remaining of said AC pulse voltages in said second drive voltage is for acceleration.

* * * * *